US012144367B2

(12) United States Patent
Gill

(10) Patent No.: US 12,144,367 B2
(45) Date of Patent: Nov. 19, 2024

(54) AEROSOL GENERATING ARTICLE AND AN AEROSOL GENERATING DEVICE FOR HEATING THE SAME

(71) Applicant: JT International S.A., Geneva (CH)

(72) Inventor: Mark Gill, London (GB)

(73) Assignee: JT International S.A. (CH)

( * ) Notice: Subject to any disclaimer, the term of this patent is extended or adjusted under 35 U.S.C. 154(b) by 930 days.

(21) Appl. No.: 17/046,563

(22) PCT Filed: May 15, 2019

(86) PCT No.: PCT/EP2019/062465
§ 371 (c)(1),
(2) Date: Oct. 9, 2020

(87) PCT Pub. No.: WO2019/219740
PCT Pub. Date: Nov. 21, 2019

(65) Prior Publication Data

US 2021/0127738 A1 May 6, 2021

(30) Foreign Application Priority Data

May 18, 2018 (EP) .................................... 18173128

(51) Int. Cl.
*A24F 40/50* (2020.01)
*A24C 5/01* (2020.01)
(Continued)

(52) U.S. Cl.
CPC .................. *A24C 5/01* (2020.01); *A24D 1/20* (2020.01); *A24F 40/465* (2020.01); *A24F 40/50* (2020.01); *A24F 40/20* (2020.01); *H05B 6/105* (2013.01)

(58) Field of Classification Search
CPC ........ A24F 40/465; A24F 40/50; A24F 40/20; A24C 5/01; A24D 1/20; H05B 6/105
(Continued)

(56) References Cited

U.S. PATENT DOCUMENTS

| | | | |
|---|---|---|---|
| 11,765,795 | B2 | 9/2023 | Abi Aoun et al. |
| 2015/0245669 | A1 | 9/2015 | Cadieux et al. |

(Continued)

FOREIGN PATENT DOCUMENTS

| | | | | |
|---|---|---|---|---|
| CN | 105263346 A | | 1/2016 | |
| CN | 106455704 A | * | 2/2017 | ............ A24B 15/12 |

(Continued)

OTHER PUBLICATIONS

International Search Report including Written Opinion for PCT/EP2019/062465 mailed Sep. 16, 2019; 13 pages.

(Continued)

*Primary Examiner* — Peter G Leigh
(74) *Attorney, Agent, or Firm* — Lerner David LLP

(57) ABSTRACT

An aerosol generating article includes a body of aerosol forming material, a first inductively heatable susceptor having a first resonant frequency, and a second inductively heatable susceptor having a second resonant frequency that is different from the first resonant frequency. An aerosol generating system includes the aerosol generating article with an aerosol generating device, the device including an induction coil defining a place, preferably a cavity, adapted to receive, in use, an aerosol generating article, and a controller adapted to control the induction coil to selectively and/or sequentially generate a first electromagnetic field with a first frequency and a second electromagnetic field with a second frequency that is different to the first frequency.

16 Claims, 7 Drawing Sheets

(51) Int. Cl.

| | |
|---|---|
| ***A24D 1/20*** | (2020.01) |
| ***A24F 40/465*** | (2020.01) |
| *A24F 40/20* | (2020.01) |
| *H05B 6/10* | (2006.01) |

(58) Field of Classification Search
USPC .......................................................... 131/329
See application file for complete search history.

(56) References Cited

U.S. PATENT DOCUMENTS

| | | | |
|---|---|---|---|
| 2016/0150825 | A1 | 6/2016 | Mironov et al. |
| 2017/0055580 | A1 | 3/2017 | Blandino et al. |
| 2017/0079325 | A1 | 3/2017 | Mironov |
| 2018/0070632 | A1 | 3/2018 | Sur et al. |
| 2018/0132531 | A1 | 5/2018 | Sur et al. |
| 2020/0022412 | A1 | 1/2020 | Abi Aoun et al. |

FOREIGN PATENT DOCUMENTS

| | | | | | |
|---|---|---|---|---|---|
| CN | 106455711 | A | | 2/2017 | |
| WO | 9639880 | A1 | | 12/1996 | |
| WO | WO-2013164124 | A1 | * | 11/2013 | ............... A24C 5/00 |
| WO | WO-2015117704 | A1 | * | 8/2015 | ............. A24F 40/10 |
| WO | 2015176898 | A1 | | 11/2015 | |
| WO | 2015177264 | A1 | | 11/2015 | |
| WO | WO-2015177044 | A1 | * | 11/2015 | ........... A24B 15/167 |
| WO | WO-2015177294 | A1 | * | 11/2015 | ............. A24B 15/12 |
| WO | 2016184928 | A1 | | 11/2016 | |
| WO | 2017029268 | A1 | | 2/2017 | |
| WO | 2017029269 | A1 | | 2/2017 | |
| WO | 2017068094 | A1 | | 4/2017 | |
| WO | 2017068098 | A1 | | 4/2017 | |
| WO | WO-2017068100 | A1 | * | 4/2017 | ............. A24D 1/002 |
| WO | 2017085242 | A1 | | 5/2017 | |
| WO | WO-2017178394 | A1 | * | 10/2017 | ............... A24D 1/20 |
| WO | WO-2017182485 | A1 | * | 10/2017 | ........... A24B 15/167 |

OTHER PUBLICATIONS

Search Report dated Nov. 24, 2023 from the Office Action for Chinese Application No. 201980032331.4 issued Nov. 30, 2023, 3 pages. [See p. 1-2, categorizing the cited references].

Search Report dated Apr. 7, 2024 from the Office Action for Chinese Application No. 201980032331.4 issued Apr. 11, 2024, 3 pages.

* cited by examiner

AEROSOL GENERATING ARTICLE AND AN AEROSOL GENERATING DEVICE FOR HEATING THE SAME

CROSS-REFERENCE TO RELATED APPLICATIONS

The present application is a national phase entry under 35 U.S.C. § 371 of International Application No. PCT/EP2019/062465, filed May 15, 2019, published in English, which claims priority to European Application No. 18173128.2 filed May 18, 2018, all of the disclosures of which are incorporated herein by reference.

TECHNICAL FIELD

The present disclosure relates generally to an aerosol generating article, and more particularly to an aerosol generating article, which when heated by an induction coil of an aerosol generating device, generates an aerosol for inhalation by a user.

Embodiments of the present disclosure also relate to a method of inductively heating an aerosol generating article, and a method of manufacturing an aerosol generating article.

TECHNICAL BACKGROUND

Devices which heat, rather than burn, an aerosol forming material to produce an aerosol for inhalation have become popular with consumers in recent years.

Such devices may use one of a number of different approaches to provide heat to the aerosol forming material. One such approach is to provide an aerosol generating device which employs an induction heating system and into which an aerosol generating article, comprising aerosol forming material, may be removably inserted by a user. In such a device, an induction coil is provided with the device and an induction heatable susceptor is also provided. Electrical energy is provided to the induction coil when a user activates the device which in turn generates an alternating electromagnetic field. The susceptor couples with the electromagnetic field and generates heat which is transferred, for example by conduction, to the aerosol forming material and an aerosol is generated as the aerosol forming material is heated but not burnt.

Embodiments of the present disclosure seek to provide an improved user experience in which the characteristics of the aerosol are optimised and where the heating of the aerosol generating article is more accurately controlled.

SUMMARY OF THE DISCLOSURE

According to a first aspect of the present disclosure there is provided an aerosol generating article comprising:

- a body of aerosol forming material;
- a first inductively heatable susceptor having a first resonant frequency; and
- a second inductively heatable susceptor having a second resonant frequency that is different from the first resonant frequency.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The aerosol forming material may be any type of solid or semi-solid material. Example types of solid or semi-solid material include powder, granules, pellets, shreds, strands, particles, gel, strips, loose leaves, cut filler, porous material, foam material or sheets. The aerosol forming material may comprise plant derived material and in particular tobacco.

The aerosol forming material may comprise an aerosol-former. Examples of aerosol-formers include polyhydric alcohols and mixtures thereof such as glycerine or propylene glycol. Typically, the aerosol forming material may comprise an aerosol-former content of between approximately 5% and approximately 50% on a dry weight basis. In some embodiments, the aerosol forming material may comprise an aerosol-former content of approximately 15% on a dry weight basis.

Also, the aerosol forming material may be the aerosol-former itself. In this case, the aerosol forming material may be a liquid. Also, in this case, the aerosol generating article may include a liquid retaining substance (e.g., a bundle of fibres, porous material such as ceramic, etc.) which retains the liquid to be aerosolized and allows an aerosol to be formed and released/emitted from the liquid retaining substance, for example towards an outlet for inhalation by a user.

Upon heating, the aerosol forming material may release volatile compounds. The volatile compounds may include nicotine or flavour compounds such as tobacco flavouring.

Different regions of the body may comprise different types of aerosol forming material, may include different aerosol-formers or have different aerosol-former content, or may release different volatile compounds upon heating.

There is no restriction on the shape and form of the aerosol generating article. In some embodiments, the aerosol generating article may be substantially cylindrical in shape and as such any cavity in an aerosol generating device for heating the aerosol generating article may be arranged to receive a substantially cylindrical article. This may be advantageous as, often, vaporisable or aerosolable substances and tobacco products in particular, are packaged and sold in cylindrical form. Furthermore, it is convenient to use a helical coil to heat the susceptors (by inducing eddy current and/or magnetic hysteresis losses in the susceptors) and so providing the aerosol generating article in a cylindrical form is advantageous as they can be sized to fit efficiently within the helical coil with minimum use of excess material.

The aerosol forming material may be held inside an air permeable material. This may comprise an air permeable material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. In one embodiment, the aerosol forming material may be wrapped in paper. The aerosol forming material may also be held inside a material that is not air permeable, but which comprises appropriate perforations or openings to allow air flow.

Alternatively, the aerosol generating article may consist of the body of aerosol forming material itself.

The aerosol generating article may also include a third inductively heatable susceptor having a third resonant frequency that is different to the first and second resonant frequencies.

Each susceptor may comprise one or more, but not limited, of aluminium, iron, nickel, stainless steel and alloys thereof, e.g. Nickel Chromium or Nickel Copper. With the application of an alternating electromagnetic field of appropriate frequency, each susceptor may generate heat due to eddy currents and/or magnetic hysteresis losses resulting in a conversion of energy from electromagnetic to heat.

One or more of the susceptors may take the form of a resonant circuit comprising a loop of conductive material (e.g., comprising one of the materials mentioned above) in series with a capacitor (and optionally also in series with an additional inductance over and above that provided by the loop itself). By choosing an appropriate capacitance of the capacitor, the resonant circuit may be tuned to any desired resonant frequency. The capacitor may be included in the aerosol generating article, or it may be provided within the aerosol generating device and electrical connection terminals are provided in the article for connecting two ends of the conductive loop to corresponding terminals on the device which then connect to the capacitor to form the resonant susceptor element only when the aerosol generating article is fitted into the device.

The first, second, and optional third, resonant frequencies may be selected from the following frequencies: approximately 250 kHz, approximately 200 kHz, and approximately 180 kHz.

In one embodiment, the first resonant frequency is within the first range, the second resonant frequency is within the second range, and the third resonant frequency is within the third range.

Using a particular combination of resonant frequencies and frequency separation permits effective selective (or "zonal") heating of the aerosol forming material to be achieved.

In general terms, it will be understood that the aerosol generating article may have two or more inductively heatable susceptors, each susceptor having its own respective resonant frequency between approximately 80 kHz and approximately 500 KHz. Using different resonant frequencies permits selective (or "zonal") heating of the aerosol forming material to be carried out by controlling an induction coil to generate an electromagnetic field with a frequency that is substantially equal to the resonant frequency of the susceptor that is to be inductively heated and which in turn heats, rather than burns, adjacent aerosol forming material to release aerosol. Different regions of the body may be selectively heated, for example to maintain consistency in the release of aerosol from the aerosol generating article or to provide a desired experience for the user. This selective heating of the aerosol forming material is preferably carried out using an aerosol generating device that is described in more detail below.

Generating an electromagnetic field with a frequency that is substantially equal to the resonant frequency of a particular susceptor will cause that susceptor to generate a heat amount. It may also cause one or more of the other susceptors of the aerosol generating article (i.e., any susceptor that has a resonant frequency that is not substantially equal to the frequency of the generated electromagnetic field) to generate a heat amount that is typically less than the heat amount generated by the particular susceptor, and which may be zero or substantially zero. Any selective heating of a particular susceptor should not, therefore, be construed as meaning that the other susceptors are not heated at all, but only that the selective heating of the particular susceptor will typically be primarily responsible for the release of aerosol from aerosol forming material adjacent the particular susceptor.

In an embodiment, to allow for selective heating of the aerosol forming material, the first susceptor may be located only in a first region of the body and the second susceptor may be located in a second region of the body, and optionally also in the first region of the body, or vice versa. The body may therefore have a first region in which both the first and second susceptors are located and a second region in which only the second susceptor is located. The first region may be downstream of the second region relative to an aerosol flow direction within the article. In this case, the first region of the body may be selectively heated in a first step of a heating sequence by generating an electromagnetic field with a frequency that is substantially equal to the first resonant frequency to thereby selectively heat the first susceptor, and the first and second regions of the body may be selectively heated in a second step of the heating sequence by generating an electromagnetic field with a frequency that is substantially equal to the second resonant frequency to thereby selectively heat the second susceptor. Such a heating sequence may generate aerosol from the first region during the first step and, during the second step, may generate aerosol from the second region and prevent aerosol from being caught in the first region, for example.

In an embodiment, at least one of the first susceptor and the second susceptor, and more preferably both of the first and second susceptors, may form part of a wrapper surrounding the body of aerosol forming material. The wrapper surface may be substantially parallel with an aerosol flow direction within the article. Such an aerosol generating article is easy to manufacture.

A first area of the wrapper may include the first susceptor and a second area of the wrapper, different to the first area, may include the second susceptor. The first and second areas may overlap or be mutually exclusive. The body of aerosol forming material may have a first region aligned generally with the first susceptor and a second region aligned generally with the second susceptor. In this case, the first region of the body may be selectively heated by generating an electromagnetic field with a frequency that is substantially equal to the first resonant frequency to thereby selectively heat the first susceptor, and the second region of the body may be selectively heated by generating an electromagnetic field with a frequency that is substantially equal to the second resonant frequency to thereby selectively heat the second susceptor.

At least one of the first susceptor and the second susceptor, and more preferably both of the first and second susceptors, may form part of an electrical path surrounding the body. Whilst each susceptor may extend only partly around the body, typically each susceptor will comprises a band that extends completely around the body to form the electrical path. Forming an electrical path may make heating the aerosol forming material more uniform and more efficient.

A third area of the wrapper, different from the first and second areas, may include a third inductively heatable susceptor having a third resonant frequency different to the first and second resonant frequencies. The third area may be aligned generally with a third region of the body. The third region of the body may be selectively heated by generating an electromagnetic field with a frequency that is substantially equal to the third resonant frequency to thereby selectively heat the third susceptor.

In an embodiment, at least one of the first susceptor and the second susceptor, and more preferably both of the first and second susceptors, may be formed as a plate located at least partly within the body. Forming the first and susceptors as a plate can generate effective heating of the body of aerosol forming material. A surface of each plate may be substantially perpendicular to an aerosol flow direction within the article. The body may have a first region adjacent the first susceptor and a second region adjacent the second susceptor. In this case, the first region of the body may be selectively heated by generating an electromagnetic field with a frequency that is substantially equal to the first resonant frequency to thereby selectively heat the first susceptor, and the second region of the body may be selectively heated by generating an electromagnetic field with a frequency that is substantially equal to the second resonant frequency to thereby selectively heat the second susceptor.

A third inductively heatable susceptor having a third resonant frequency different to the first and second resonant frequencies may also be formed as a plate located at least partly within the body. The body may have a third region adjacent the third susceptor that may be selectively heated by generating an electromagnetic field with a frequency that is substantially equal to the third resonant frequency.

The plates may be spaced apart within the body, for example along an axis of the body that is parallel with the aerosol flow direction. Each plate may have any suitable shape but might typically be formed as a circular disc.

At least one of the first susceptor and the second susceptor may be formed as a planar strip that is bonded to the body of aerosol forming material. The planar strip may be laminated to an electrically insulating material such as paper or another woven or nonwoven fabric or material, or from a suitable ceramic, for example. A third susceptor may also be formed as a planar strip that is bonded to the body. Forming a planar strip that is bonded such an aerosol generating article may be easily manufactured. Where a susceptor is bonded to the body of aerosol forming material, it is preferable if the aerosol forming material is in a substantially solid or rigid form such as Reconstituted Tobacco (RTB), e.g., in the form of RTB paper, or in the form of a solid or semi-solid but porous foam, mousse or gel, or a congelation of a mixture of solid and liquid materials etc.

In an embodiment, at least one of the first susceptor and the second susceptor, and more preferably both of the first and second susceptors, may be formed as a plurality of particulates. The particulates may be distributed substantially evenly within the body or within a respective region or regions of the body. Substantially even distribution of the particulates within the body of aerosol forming material may allow the aerosol generating article to be easily manufactured. To allow for selective heating of the aerosol forming material, the particulates defining the first susceptor may be located only in a first region of the body and the particulates defining the second susceptor may be located in a second region of the body, and optionally also in the first region of the body, or vice versa. The body may therefore have a first region in which both the first and second susceptors are located and a second region in which only the second susceptor is located. The first region may be downstream of the second region relative to an aerosol flow direction within the article. In this case, the first region of the body may be selectively heated in a first step of a heating sequence by generating an electromagnetic field with a frequency that is substantially equal to the first resonant frequency to thereby preferentially heat the particulates of the first susceptor, and the first and second regions of the body may be selectively heated in a second step of the heating sequence by generating an electromagnetic field with a frequency that is substantially equal to the second resonant frequency to thereby selectively heat the particulates of the second susceptor. Such a heating sequence may generate aerosol from the first region during the first step and, during the second step, may generate aerosol from the second region and prevent aerosol from being caught in the first region, for example.

A third susceptor having a third resonant frequency different to the first and second resonant frequencies may also be formed as a plurality of particulates. The particulates may be distributed substantially evenly within the body or within a respective region or regions of the body.

The particulates of each susceptor may have any suitable shape and size.

According to a second aspect of the present disclosure there is provided an aerosol generating device comprising:

an induction coil defining a place, preferably a cavity, adapted to receive, in use, an aerosol generating article; and a controller adapted to control the induction coil to selectively and/or sequentially generate a first electromagnetic field with a first frequency and a second electromagnetic field with a second frequency that is different to the first frequency.

The aerosol generating device may be arranged to operate with fluctuating electromagnetic fields having a magnetic flux density of between approximately 20 mT and approximately 2.0 T at the point of highest concentration.

The aerosol generating device may include a power source, such as a battery, for example, and related circuitry.

Whilst the induction coil may comprise any suitable material, typically the induction coil may comprise a Litz wire or a Litz cable.

Whilst the aerosol generating device may take any shape and form, it may be arranged to take substantially the form of the induction coil, to reduce excess material use and improve the coupling efficiency of the electromagnetic field to the susceptors. The induction coil may be substantially helical in shape.

The circular cross-section of a helical induction coil facilitates the insertion of an aerosol generating article into the device and ensures uniform heating. The resulting shape of the device is also comfortable for the user to hold.

The aerosol generating device may be arranged to accommodate aerosol generating articles according to a first type that include an integral filter through which a user may inhale the aerosol released on heating. The aerosol generating device may also be arranged to accommodate aerosol generating articles according to a second type and where the device may further comprise a mouthpiece.

The controller may comprise a programmable, digital controller.

In general terms, it will be understood that each aerosol generating article may have two or more inductively heatable susceptors, each susceptor having its own respective resonant frequency. The controller may be adapted to control the induction coil to selectively generate electromagnetic fields with corresponding number of frequencies, each frequency being substantially equal to a respective resonant frequency of a susceptor that is to be inductively heated. As a result, the controller can provide for selective (or "zonal") heating of the aerosol forming material of the aerosol generating article to be carried out. Different regions of the body may be selectively heated, for example to maintain consistency in the release of aerosol from the aerosol generating article or to provide a desired experience for the user. The resonant frequencies may be separated by a minimum frequency gap to allow the frequency of the electromagnetic field generated by the induction coil to be properly selected or "tuned" to heat a particular susceptor.

The controller may be further adapted to control the induction coil to generate the different frequencies according to one or more heating sequences. This may be useful for the user. During a heating sequence, the different frequencies may be generated in a certain sequence and for a certain period of time. For each heating sequence, the sequence or order of the frequencies and the period of time for which each frequency is generated may be selected to provide a desired heating effect.

According to a third aspect of the present disclosure there is provided an aerosol generating system for generating an aerosol for inhalation by a user, the aerosol generating system comprising:

- an aerosol generating device as described above; and
- an aerosol generating article as described above, the aerosol generating article being received in the place, preferably cavity, of the aerosol generating device;
- wherein the first frequency of the first electromagnetic field is substantially equal to the first resonant frequency of the first susceptor, and the second frequency of the second electromagnetic field is substantially equal to the second resonant frequency of the second susceptor.

The first susceptor may generate a heat amount A and the second susceptor may generate a heat amount B when the induction coil generates the first electromagnetic field, and the first susceptor may generate a heat amount C and the second susceptor may generate a heat amount D when the induction coil generates the second electromagnetic field. The heat amounts B and C may be less than the heat amount A. The heat amounts B and C may be less than the heat amount D. The heat amounts B and/or C may be zero or substantially zero such that the second susceptor does not generate any heat when the induction coil generates the first electromagnetic and/or the first susceptor does not generate any heat when the induction coil generates the second electromagnetic field.

The controller may be further adapted to control the induction coil to generate the different frequencies according to a heating sequence and to reset the heating sequence in response to a detected change in the aerosol generating article. For example, if the aerosol generating article is removed during a heating sequence and a new aerosol generating article is inserted into the device, the heating sequence may be restarted.

The controller may be further adapted to control the induction coil to generate the different frequencies according to a plurality of heating sequences and to select a particular heating sequence automatically based on a detected type of aerosol generating article or in response to a manual input. For example, the controller may automatically select a particular heating sequence that is specifically designed to be suitable for a particular type of aerosol generating article (e.g., to provide the correct heating effect) or the user may manually select a particular heating sequence based on a personal preference. This automatic or manual selection may be useful for the user of the aerosol generating device.

According to a fourth aspect of the present disclosure there is provided a method of inductively heating an aerosol generating article comprising a body of aerosol forming material, a first inductively heatable susceptor having a first resonant frequency, and a second inductively heatable susceptor having a second resonant frequency which is different from the first resonant frequency;

the method comprising the steps of:

- heating the body by a heat amount A generated by the first susceptor and a heat amount B generated by the second susceptor by generating a first electromagnetic field with a first frequency that is substantially equal to the first resonant frequency; and
- heating the body by a heat amount C generated by the first susceptor and a heat amount D generated by the second susceptor by generating a second electromagnetic field with a second frequency that is substantially equal to the second resonant frequency;
- wherein the heat amounts B and C are less than the heat amount A; and
- wherein the heat amounts B and C are less than the heat amount D.

The heat amounts B and/or C may be zero or substantially zero.

According to a fifth aspect of the present disclosure there is provided a method of manufacturing an aerosol generating article, the method comprising the steps of:

- forming a wrapper comprising, in a first area, a first inductively heatable susceptor having a first resonant frequency and, in a second area, a second inductively heatable susceptor having a second resonant frequency which is different from the first resonant frequency, the second area being different from the first area; and
- surrounding a body of aerosol forming material with the wrapper.

The method may further comprise the step of using the wrapper to form an electrical path surrounding the body. The electrical path may provide more uniform or efficient heating of the aerosol forming material and may be formed by joining the edges of the wrapper, for example, by adhering the edges with an electrically conductive adhesive, by welding or soldering, or by contacting the edges.

The step of forming the wrapper may further comprise laminating the wrapper with an electrically insulating material such as paper or another woven or nonwoven fabric or material, or from a suitable ceramic, for example.

The step of forming the wrapper may further comprise forming alternate first areas of the first susceptor and second areas of the second susceptor along a longitudinal direction of the wrapper. The first and second areas may overlap or be mutually exclusive. Third areas of a third inductively heatable susceptor having a third resonant frequency different to the first and second resonant frequencies may also be formed on the wrapper.

DETAILED DESCRIPTION OF THE EMBODIMENTS

Embodiments of the present disclosure will now be described by way of example only and with reference to the accompanying drawings.

Figure 1:
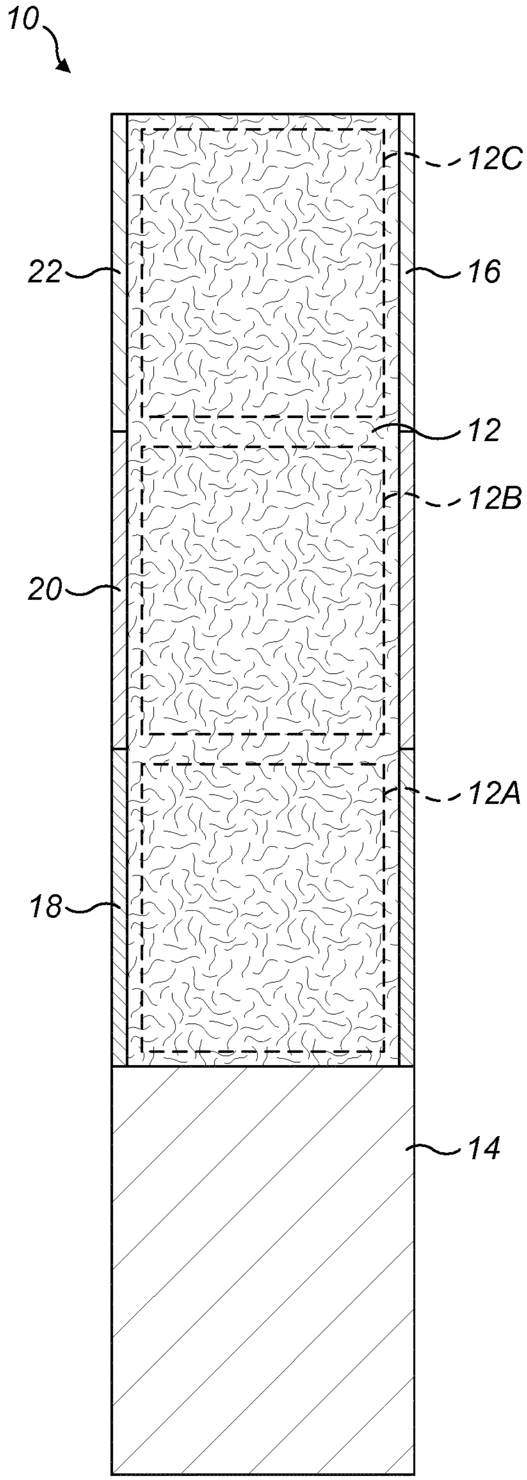
FIG. 1 is a diagrammatic cross-sectional view of a first embodiment of an aerosol generating article where the susceptors form part of a wrapper.

Referring to FIG. 1, there is shown diagrammatically an aerosol generating article 10 according to an example of the present disclosure. The aerosol generating article 10 is of a so-called “stick” type and is substantially cylindrical.

The aerosol generating article 10 comprises a body 12 of aerosol forming material and a filter 14. In this case, the aerosol forming material is a type of solid or semi-solid material and may comprise plant derived material and in particular tobacco. The aerosol forming material may comprise an aerosol-former.

The aerosol forming material is held within a wrapper 16 that comprises a first susceptor 18, a second susceptor 20, and a third susceptor 22. Each susceptor is formed as a cylindrical band that extends completely around the body 12 to define an electrical pathway for more uniform and efficient heating. Although not shown, the wrapper 16 may be laminated to an electrically insulating material.

The first susceptor 18 has a resonant frequency of 250 kHz. The second susceptor 20 has a resonant frequency of 200 kHz. The third susceptor 22 has a resonant frequency of 180 kHz.

In this embodiment, the first, second and third susceptors 18, 20 and 22 take the form of a resonant circuit comprising a cylindrical band or loop of conductive material (e.g., comprising one of the materials mentioned above) in series with a capacitor. By choosing an appropriate capacitance of the capacitor (e.g., 25 microfarads for the first susceptor, 35 microfarads for the second susceptor, and 40 microfarads for the third susceptor), the resonant circuit may be tuned to the desired resonant frequencies. It will be understood that the exact capacitance values will depend upon factors such as the dimensions of the loop, the susceptor material, the properties of the device etc. and will be calculated as necessary. In this embodiment, the capacitors are included in the aerosol generating article 10. However, in other embodiments the capacitors are provided within the aerosol generating device and electrical connection terminals are provided in the article for connecting two ends of each conductive loop to corresponding terminals on the device which then connect to the respective capacitor to form the resonant susceptor element only when the aerosol generating article is fitted into the device.

A first region 12A of the body is aligned generally with the first susceptor 18. A second region 12B of the body is aligned generally with the second susceptor 20. A third region 12C of the body is aligned generally with the third susceptor 22.

The regions 12A, 12B and 12C are shown in FIG. 1 to be non-overlapping simply for clarity and are not intended to rigidly identify only those parts of the body 12 that would be heated by a particular susceptor in a practical implementation of the aerosol generating article. The intention is simply to illustrate, diagrammatically, how different regions of the body 12 may be selectively heated by each susceptor. The same applies to the corresponding regions shown in FIGS. 3, 4 and 7.

If an induction coil (not shown) located adjacent the aerosol generating article 10 generates an electromagnetic field with a frequency that is substantially equal to 250 kHz, the first susceptor 18 is inductively heated and this heat is transferred, for example by conduction, to the first region 12A. An aerosol is generated as the first region 12A of the body is heated and is inhaled by the user through the filter 14. If the induction coil generates an electromagnetic field with a frequency that is substantially equal to 200 kHz, the second susceptor 20 is inductively heated and this heat is transferred, for example by conduction, to the second region 12B. An aerosol is generated as the second region 12B of the body is heated and is inhaled by the user through the filter 14. If the induction coil generates an electromagnetic field with a frequency that is substantially equal to 180 kHz, the third susceptor 22 is inductively heated and this heat is transferred, for example by conduction, to the third region 12C. An aerosol is generated as the third region 12C of the body is heated and is inhaled by the user through the filter 14. Using susceptors with different resonant frequencies therefore permits selective (or “zonal”) heating of the aerosol forming material to be carried out by controlling the induction coil to generate an electromagnetic field with a frequency that is substantially equal to the resonant frequency of the susceptor that is to be inductively heated, and which in turn heats, but not burns, adjacent aerosol forming material to release aerosol for inhalation by the user.

Figure 2:
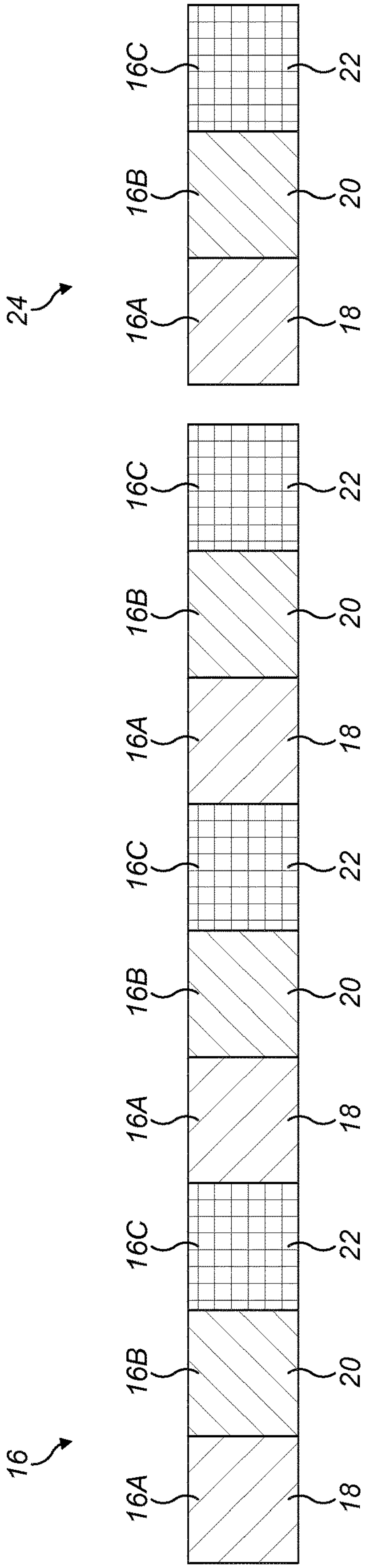
FIG. 2 is a diagrammatic view of the wrapper of FIG. 1.

Part of an extended wrapper 16 is shown diagrammatically in FIG. 2 before it is wrapped around aerosol forming material and cut into individual segments 24. In this embodiment, the extended wrapper 16 is cut at the border between two areas, but the wrapper may be cut at the middle of an area as well. Alternatively, the extended wrapper may be cut into individual lengths before being wrapped around aerosol forming material to form a segment 24.

Each segment 24 is connected to a filter 14 to form the aerosol generating article 10 shown in FIG. 1.

First areas 16A of the extended wrapper comprise the first susceptor 18, second areas 16B of the extended wrapper comprise the second susceptor 20, and third areas 16C of the extended wrapper comprise the third susceptor 22. Each segment 24 comprises a first area 16A, a second area 16B, and a third area 16C. Although the extended wrapper 16 shown in FIG. 2 has three areas, it will be understood that it may have two areas or four or more areas as required, each area having its own susceptor. Referring to FIG. 2, the areas are shown to be mutually exclusive or non-overlapping. But in a different embodiment, the areas can be overlapping with corresponding overlapping of the respective susceptors.

The long edges of the extended wrapper 16, or each individual length if the wrapper is pre-cut, may be joined together around the aerosol forming material by adhering the edges with an electrically conductive adhesive, by welding or soldering, or by contacting the edges, for example. Applicable methods of forming “stick” type aerosol generating articles according to the present disclosure are described in more detail in WO 2016/184928 and WO 96/39880, the contents of which are herein incorporated by reference. WO 2016/184928 in particular describes how an inductively heatable tobacco rod may be manufactured with individual susceptor segments entirely embedded within a tobacco substrate that in turn is held within a wrapper material which may be made of paper or foil. The tobacco rod is cut between the susceptor segments into individual tobacco plugs each having a length which is predefined by the length of the susceptor segments. A similar method might be used to form the "stick" type aerosol generating article shown in FIG. 1 by omitting the susceptor segments from the aerosol forming material and using the extended wrapper in place of the conventional wrapper material described in WO 2016/184928.

Figure 3:
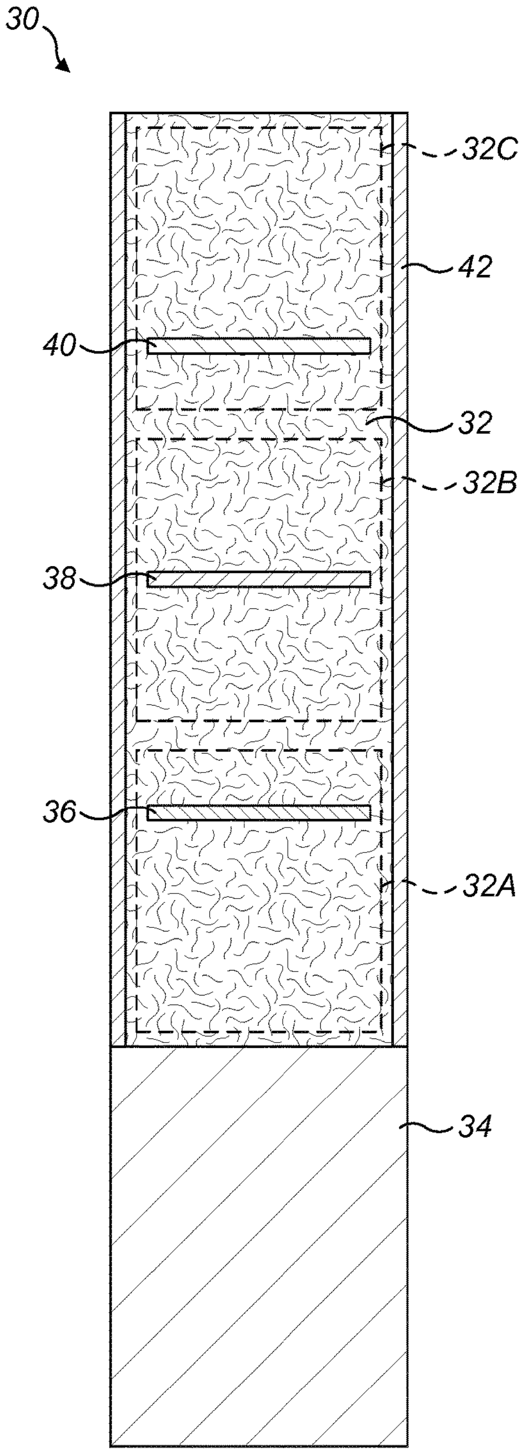
FIG. 3 is a diagrammatic cross-sectional view of a second embodiment of an aerosol generating article where the susceptors are formed as discs.

Referring to FIG. 3, there is shown diagrammatically an aerosol generating article 30 according to an example of the present disclosure. The aerosol generating article 30 is of a so-called "stick" type and is substantially cylindrical.

The aerosol generating article 30 comprises a body 32 of aerosol forming material and a filter 34. In this case, the aerosol forming material is a type of solid or semi-solid material and may comprise plant derived material and in particular tobacco. The aerosol forming material may comprise an aerosol-former. The body 32 is held within a wrapper 42 of a suitable material, e.g., paper.

A first susceptor 36, a second susceptor 38, and a third susceptor 40 are located within the body 32. Each susceptor is formed as a plate, for example, a cylindrical disc, and the susceptors are spaced apart along the axis of the body. Referring to FIG. 3 the susceptor plates are completely embedded within the body 32. The first susceptor 36 has a resonant frequency of 250 kHz. The second susceptor 38 has a resonant frequency of 200 kHz. The third susceptor 40 has a resonant frequency of 180 kHz.

A first region 32A of the body is adjacent the first susceptor 36. A second region 32B of the body is adjacent the second susceptor 38. A third region 32C of the body is adjacent the third susceptor 40.

If an induction coil (not shown) located adjacent the aerosol generating article 30 generates an electromagnetic field with a frequency that is substantially equal to 250 kHz, the first susceptor 36 is inductively heated and this heat is transferred, for example by conduction, to the first region 32A. An aerosol is generated as the first region 32A of the aerosol forming material is heated and is inhaled by the user through the filter 34. If the induction coil generates an electromagnetic field with a frequency that is substantially equal to 200 kHz, the second susceptor 38 is inductively heated and this heat is transferred, for example by conduction, to the second region 32B. An aerosol is generated as the second region 32B of the aerosol forming material is heated and is inhaled by the user through the filter 34. If the induction coil generates an electromagnetic field with a frequency that is substantially equal to 180 kHz, the third susceptor 40 is inductively heated and this heat is transferred, for example by conduction, to the third region 32C. An aerosol is generated as the third region 32C of the aerosol forming material is heated and is inhaled by the user through the filter 34.

Figure 4:
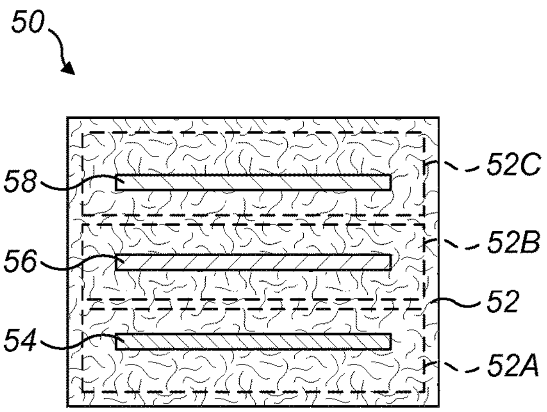
FIG. 4 is a diagrammatic cross-sectional view of a third embodiment of an aerosol generating article where the susceptors are formed as discs.

Referring to FIG. 4, there is shown diagrammatically an aerosol generating article 50 according to an example of the present disclosure. The aerosol generating article 50 is of a so-called "pod" type and is substantially cylindrical.

The aerosol generating article 50 comprises a body 52 of aerosol forming material. In this case, the aerosol forming material is a type of solid or semi-solid material and may comprise plant derived material and in particular tobacco. The aerosol forming material may comprise an aerosol-former.

A first susceptor 54, a second susceptor 56, and a third susceptor 58 are located within the body 52. Each susceptor is formed as a plate, for example, a cylindrical disc, and the susceptors are spaced apart along the axis of the body. Referring to FIG. 4 the susceptor plates are completely embedded within the body 52. The first susceptor 54 has a resonant frequency of 250 kHz. The second susceptor 56 has a resonant frequency of 200 kHz. The third susceptor 58 has a resonant frequency of 180 kHz.

A first region 52A of the body is adjacent the first susceptor 54. A second region 52B of the body is adjacent the second susceptor 56. A third region 52C of the body is adjacent the third susceptor 58.

If an induction coil (not shown) located adjacent the aerosol generating article 50 generates an electromagnetic field with a frequency that is substantially equal to 250 kHz, the first susceptor 54 is inductively heated and this heat is transferred, for example by conduction, to the first region 52A. An aerosol is generated as the first region 52A of the aerosol forming material is heated and is inhaled by the user. If the induction coil generates an electromagnetic field with a frequency that is substantially equal to 200 kHz, the second susceptor 56 is inductively heated and this heat is transferred, for example by conduction, to the second region 52B. An aerosol is generated as the second region 52B of the aerosol forming material is heated and is inhaled by the user. If the induction coil generates an electromagnetic field with a frequency that is substantially equal to 180 kHz, the third susceptor 58 is inductively heated and this heat is transferred, for example by conduction, to the third region 52C. An aerosol is generated as the third region 54C of the aerosol forming material is heated and is inhaled by the user.

Figure 5:
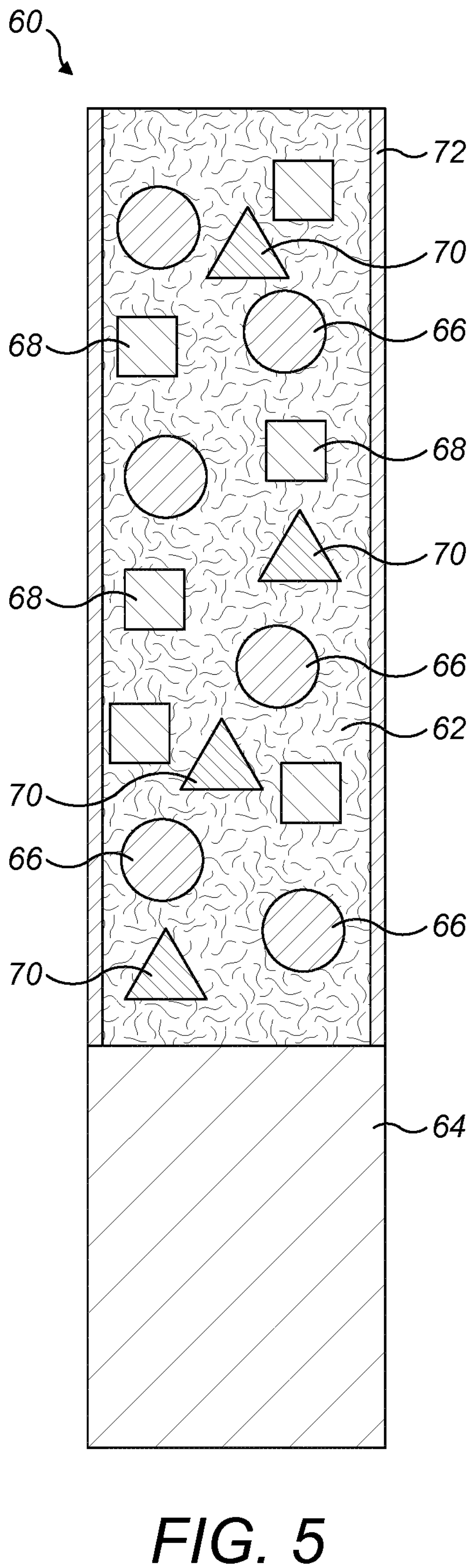
FIG. 5 is a diagrammatic cross-sectional view of a fourth embodiment of an aerosol generating article where the susceptors are formed as a plurality of particulates.

Referring to FIG. 5, there is shown diagrammatically an aerosol generating article 60 according to an example of the present disclosure. The aerosol generating article 60 is of the so-called "stick" type and is substantially cylindrical.

The aerosol generating article 60 comprises a body 62 of aerosol forming material and a filter 64. The aerosol forming material is a type of solid or semi-solid material and may comprise plant derived material and in particular tobacco. The aerosol forming material may comprise an aerosol-former. The body 62 is held within a wrapper 72 of a suitable material, e.g., paper.

A first susceptor 66, a second susceptor 68, and a third susceptor 70 are located within the body 62. Each susceptor is formed as a plurality of particulates that are substantially uniformly distributed through the body 62.

The first susceptor 66 has a resonant frequency of 250 kHz. The second susceptor 68 has a resonant frequency of 200 kHz. The third susceptor 70 has a resonant frequency of 180 kHz.

Figure 6:
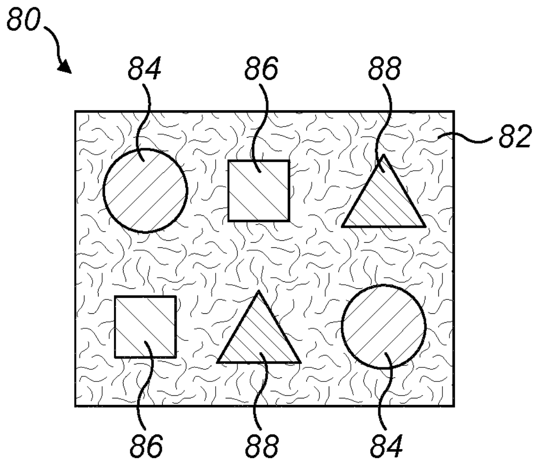
FIG. 6 is a diagrammatic cross-sectional view of a fifth embodiment of an aerosol generating article where the susceptors are formed as a plurality of particulates.

Referring to FIG. 6, there is shown diagrammatically an aerosol generating article 80 according to an example of the present disclosure. The aerosol generating article 80 is of the so-called "pod" type and is substantially cylindrical.

The aerosol generating article 80 comprises a body of aerosol forming material 82. The aerosol forming material is a type of solid or semi-solid material and may comprise plant derived material and in particular tobacco. The aerosol forming material may comprise an aerosol-former.

A first susceptor 84, a second susceptor 86, and a third susceptor 88 are located within the body 82. Like the aerosol generating article 60 shown in FIG. 5, each susceptor is formed as a plurality of particulates that are substantially uniformly distributed through the body 82.

The first susceptor 84 has a resonant frequency of 250 kHz. The second susceptor 86 has a resonant frequency of 200 kHz. The third susceptor 88 has a resonant frequency of 180 kHz.

If an induction coil (not shown) located adjacent the aerosol generating articles 60 and 80 generates an electromagnetic field with a frequency that is substantially equal to 250 kHz, the particulates of the respective first susceptor 66 and 84 are inductively heated and this heat is transferred, for example by conduction, to the respective body 62 and 82. An aerosol is generated as the aerosol forming material is heated and is inhaled by the user, in the case of the aerosol generating article 60 through the filter 64. If the induction coil generates an electromagnetic field with a frequency that is substantially equal to 200 kHz, the particulates of the respective second susceptor 68 and 86 are inductively heated and this heat is transferred, for example by conduction, to the respective body 62 and 82. An aerosol is generated as the aerosol forming material is heated and is inhaled by the user, in the case of the aerosol generating article 60 through the filter 64. If the induction coil generates an electromagnetic field with a frequency that is substantially equal to 180 kHz, the particulates of the respective third susceptor 70 and 88 are inductively heated and this heat is transferred, for example by conduction, to the respective body 62 and 82. An aerosol is generated as the aerosol forming material is heated and is inhaled by the user, in the case of the aerosol generating article 60 through the filter 64.

Figure 7:
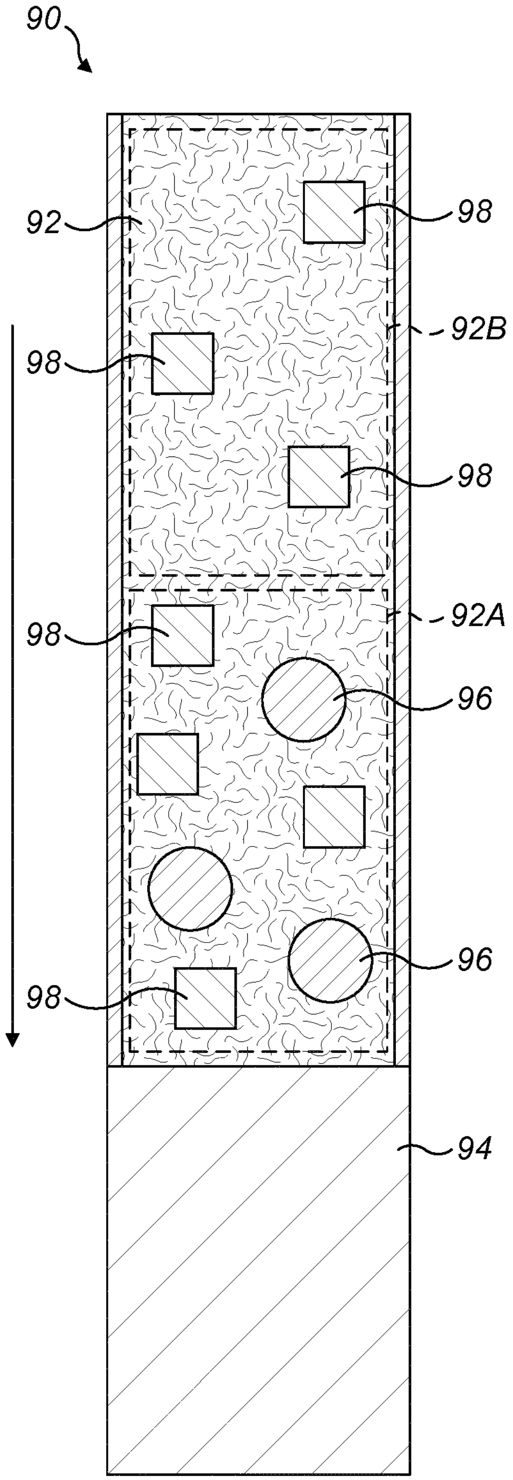
FIG. 7 is a diagrammatic cross-sectional view of a sixth embodiment of an aerosol generating article where the susceptors are formed as a plurality of particulates with a particular distribution within the body of aerosol forming material.

Referring to FIG. 7, there is shown diagrammatically an aerosol generating article 90 according to an example of the present disclosure. The aerosol generating article 90 is of the so-called "stick" type and is substantially cylindrical.

The aerosol generating article 90 comprises body of aerosol forming material 92 and a filter 94. In this case, the aerosol forming material is a type of solid or semi-solid material and may comprise plant derived material and in particular tobacco. The aerosol forming material may comprise an aerosol-former.

A first susceptor 96 is formed as a plurality of particulates that are substantially uniformly distributed through a first region 92A of the body. A second susceptor 98 is formed as a plurality of particulates that are substantially uniformly distributed through the first region 92A and a second region 92B of the body. The first susceptor 96 has a resonant frequency of 250 kHz. The second susceptor 98 has a resonant frequency of 200 kHz.

If an induction coil (not shown) located adjacent the aerosol generating article 90 generates an electromagnetic field with a frequency that is substantially equal to 250 kHz, the particulates of the first susceptor 96 are inductively heated and this heat is transferred, for example by conduction, to the first region 92A of the body. If the induction coil generates an electromagnetic field with a frequency that is substantially equal to 200 kHz, the particulates of the second susceptor 98 are inductively heated and this heat is transferred, for example by conduction, to the first and second regions 92A and 92B of the body.

The arrow in FIG. 7 indicates the aerosol flow direction within the aerosol generating article 90. It can therefore be seen that the first region 92A is downstream of the second region 92B. The first region 92A of the body may be selectively heated in a first step of a heating sequence by generating an electromagnetic field with a frequency of 250 kHz to generate aerosol in the first region that is inhaled by the user through the filter 94. The first and second regions 92A and 92B of the body may be selectively heated in a second step of the heating sequence by generating an electromagnetic field with a frequency of 200 kHz to generate aerosol in the second region 92B and to prevent aerosol from being caught in the first region 92A.

Figure 8:
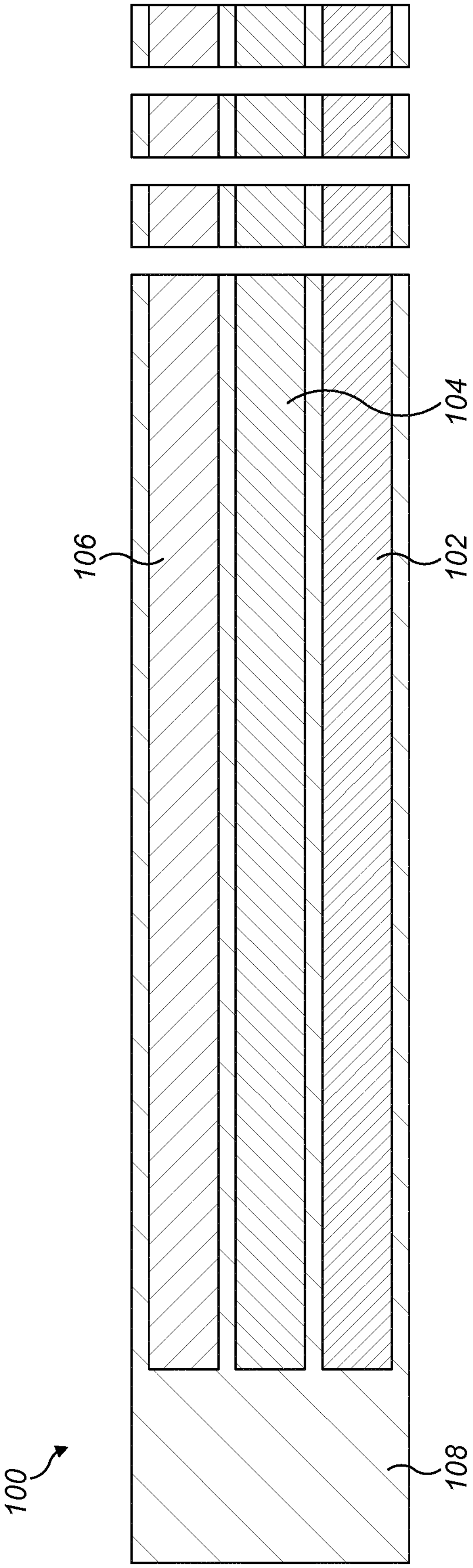
FIG. 8 is a diagrammatic cross-sectional view of a seventh embodiment of an aerosol generating article where the susceptors are formed as a strip.

Referring to FIG. 8, there is shown diagrammatically part of an aerosol generating article 100 according to an example of the present disclosure.

A first susceptor 102 is formed as a planar strip. A second susceptor 104 is formed as a planar strip. A third susceptor 106 is formed as a planar strip. The strips are laminated to an electrically insulating material 108 and bonded to the body of aerosol forming material (not shown) before being cut into individual segments. Alternatively, the strips can be cut into individual segments before being bonded to the aerosol forming material.

The first susceptor 102 has a resonant frequency of 250 kHz. The second susceptor 104 has a resonant frequency of 200 kHz. The third susceptor 106 has a resonant frequency of 180 kHz.

Figure 9:
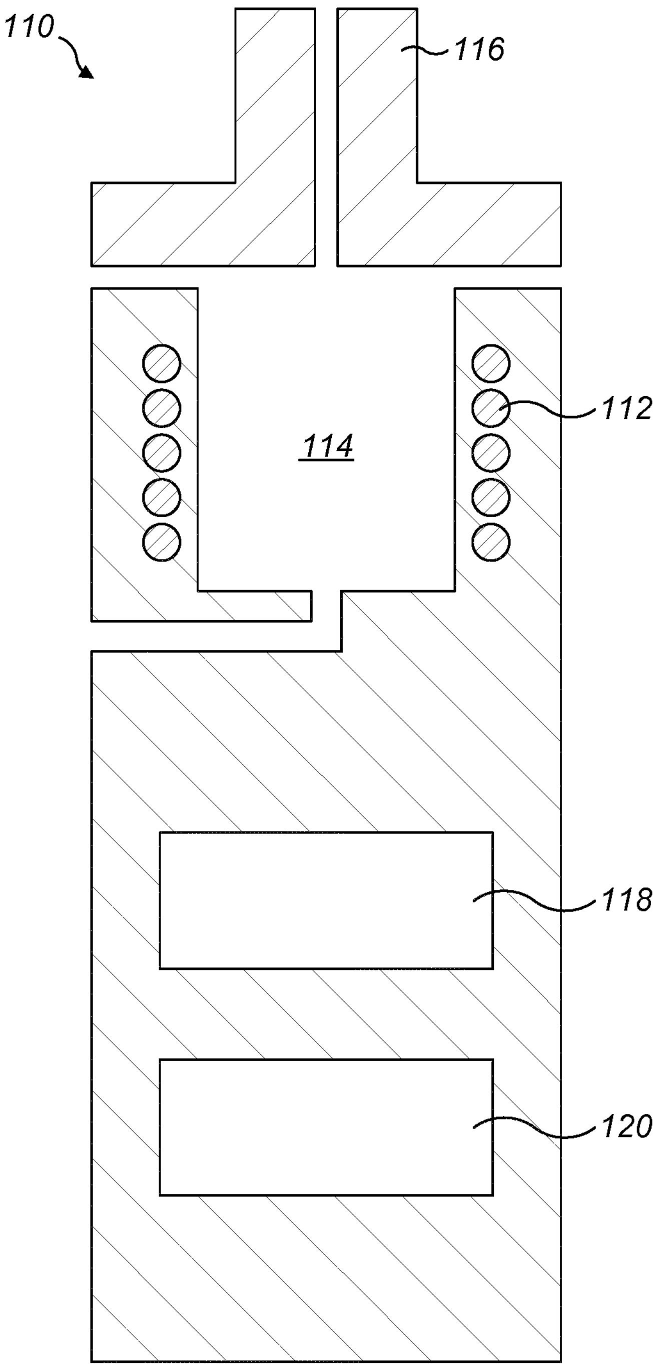
FIG. 9 is a diagrammatic cross-sectional view of an aerosol generating device.

Referring to FIG. 9, there is shown diagrammatically an aerosol generating device 110 according to an example of the present disclosure.

The aerosol generating device 110 includes a helical induction coil 112 defining a cavity 114 that is adapted to receive an aerosol generating article, in this case of the so-called "pod" type shown in FIGS. 4 and 6. The aerosol generating device 110 includes a mouthpiece 116 through which released aerosol may be inhaled by the user. A similar aerosol generating device may be adapted to receive a "stick" type aerosol generating article. Such an aerosol generating device would not include a mouthpiece because the user inhales the released aerosol through the integral filter of the aerosol generating article.

The aerosol generating device includes a controller 118 and a power source 120.

The controller 118 is adapted to control the induction coil 112 to selectively generate an alternating electromagnetic field with a certain frequency. In particular, the controller 118 may control the induction coil 112 to generate a first electromagnetic field with a first frequency of 250 kHz for inductively heating a first susceptor, and a second electromagnetic field with a second frequency of 200 kHz for inductively heating a second susceptor. If the aerosol generating article includes a third susceptor, the controller 118 may control the induction coil 112 to generate a third electromagnetic field with a third frequency of 180 kHz for inductively heating the third susceptor.

The controller 118 may control the induction coil 112 to generate the different frequencies according to one or more heating sequences. During a heating sequence, the different frequencies may be generated in a certain sequence or order and for a certain period of time. For each heating sequence, the order of the frequencies and the period of time for which each frequency is generated may be selected to provide a desired heating effect. For example, with reference to the aerosol generating article 90 shown in FIG. 7, a heating sequence might include a first step of generating the first electromagnetic field with a first frequency of 250 kHz to inductively heat the particulates of the first susceptor 96 for a period of time and a second step of generating the second electromagnetic field with a second frequency of 200 kHz to inductively heat the particulates of the second susceptor 98 for a period of time. In the case of the aerosol generating articles 10, 30, 50, 60, 80 and 100 shown in FIGS. 1, 3 to 6 and 8, respectively, a heating sequence might include a first step of generating the first electromagnetic field with a first frequency of 250 kHz to inductively heat the first susceptor for a period of time, a second step of generating the second electromagnetic field with a second frequency of 200 kHz to inductively heat the second susceptor for a period of time, and a third step of generating the third electromagnetic field with a third frequency of 180 kHz to inductively heat the third susceptor. The first, second and third susceptors may be inductively heated in any order and for any suitable period of time. A heating sequence may be repeated any suitable number of times. More complicated heating sequences can be utilized by the controller, for example where the order in which the susceptors are heated or the heating time varies. The controller can start, stop or reset the heating sequence as appropriate. A suitable heating sequence may be selected automatically by the aerosol generating device 110, for example, based on the type of aerosol generating article that is inserted into the cavity 114, or manually by the user.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating article according comprising:

a body of aerosol forming material;

a first inductively heatable susceptor having a first resonant frequency; and a second inductively heatable susceptor having a second resonant frequency that is different from the first resonant frequency, wherein the first susceptor is located only in a first region of the body and the second susceptor is located in a second region of the body, and wherein the first region is downstream of the second region relative to an aerosol flow direction within the article.

2. The aerosol generating article according to claim 1, wherein at least one of the first susceptor and the second susceptor is formed as a plate located at least partly within the body.

3. The aerosol generating article according to claim 2, wherein a surface of each plate is substantially perpendicular to the aerosol flow direction within the article.

4. The aerosol generating article according to claim 1, wherein at least one of the first susceptor and the second susceptor is formed as a planar strip that is bonded to the body.

5. The aerosol generating article according to claim 1, wherein at least one of the first susceptor and the second susceptor is formed as a plurality of particulates.

6. The aerosol generating article according to claim 1, wherein the second susceptor is also located in the first region of the body.

7. The aerosol generating article according to claim 1, wherein at least one of the first susceptor and the second susceptor is formed as a planar strip that is bonded to the body and laminated to an electrically insulating material.

8. The aerosol generating article according to claim 1, wherein at least one of the first susceptor and the second susceptor is formed as a plurality of particulates, the particulates being distributed substantially evenly within the body or within a respective region or regions of the body.

9. An aerosol generating system for generating an aerosol for inhalation by a user, the aerosol generating system comprising:

an aerosol generating device including an induction coil defining a place adapted to receive, in use, an aerosol generating article, and a controller adapted to control the induction coil to selectively and/or sequentially generate a first electromagnetic field with a first frequency and a second electromagnetic field with a second frequency that is different to the first frequency; and the aerosol generating article according to claim 1, the aerosol generating article being received in the place of the aerosol generating device;

wherein the first frequency of the first electromagnetic field is substantially equal to the first resonant frequency of the first susceptor, and the second frequency of the second electromagnetic field is substantially equal to the second resonant frequency of the second susceptor.

10. The aerosol generating system according to claim 9, wherein the controller is further adapted to control the induction coil to generate the first and second electromagnetic fields according to one or more heating sequences.

11. The aerosol generating system according to claim 9, wherein the first susceptor generates a heat amount A and the second susceptor generates a heat amount B when the induction coil generates the first electromagnetic field, and the first susceptor generates a heat amount C and the second susceptor generates a heat amount D when the induction coil generates the second electromagnetic field;

wherein the heat amounts B and C are less than the heat amount A; and wherein the heat amounts B and Care less than the heat amount D.

12. The aerosol generating system according to claim 9, wherein the place is a cavity.

13. An aerosol generating article comprising:

a body of aerosol forming material;

a first inductively heatable susceptor having a first resonant frequency; and a second inductively heatable susceptor having a second resonant frequency that is different from the first resonant frequency, wherein at least one of the first susceptor and the second susceptor forms part of a wrapper surrounding the body.

14. A method of inductively heating an aerosol generating article comprising a body of aerosol forming material, a first inductively heatable susceptor having a first resonant frequency, and a second inductively heatable susceptor having a second resonant frequency which is different from the first resonant frequency;

the method comprising the steps of:

heating the body by a heat amount A generated by the first susceptor and a heat amount B generated by the second susceptor by generating a first electromagnetic field with a first frequency that is substantially equal to the first resonant frequency; and heating the body by a heat amount C generated by the first susceptor and a heat amount D generated by the second susceptor by generating a second electromagnetic field with a second frequency that is substantially equal to the second resonant frequency;

wherein the heat amounts B and C are less than the heat amount A; and wherein the heat amounts B and C are less than the heat amount D.

15. A method of manufacturing an aerosol generating article, the method comprising the steps of:

forming a wrapper comprising, in a first area, a first inductively heatable susceptor having a first resonant frequency and, in a second area, a second inductively heatable susceptor having a second resonant frequency which is different from the first resonant frequency, the second area being different from the first area; and surrounding a body of aerosol forming material with the wrapper.

16. A method according to claim 15, wherein the step of forming the wrapper further comprises forming alternate first areas of the first susceptor and second areas of the second susceptor along a longitudinal direction of the wrapper.

* * * * *